United States Patent [19]

Pardo et al.

[11] 4,156,367

[45] May 29, 1979

[54] LINEAR-DISPLACEMENT MODULE FOR AUTOMATIC MACHINES

[75] Inventors: Pierre Pardo, Puteaux, France; François Pruvot, Pully, Switzerland

[73] Assignee: Regie Nationale des Usines Renault, Boulogne-Billancourt, France

[21] Appl. No.: 790,150

[22] Filed: Apr. 22, 1977

[30] Foreign Application Priority Data

Apr. 22, 1976 [FR] France ................................ 76 11882

[51] Int. Cl.² ............................................. F16H 21/02
[52] U.S. Cl. ........................................ 74/27; 212/13; 74/606 R
[58] Field of Search .......................... 74/412, 27, 606; 212/13, 12, 10, 11; 214/16.4

[56] References Cited

U.S. PATENT DOCUMENTS

| 2,220,704 | 11/1940 | Boles et al. | 212/13 |
|---|---|---|---|
| 3,412,876 | 11/1958 | Calabrese | 212/13 |
| 3,608,878 | 9/1971 | Dreshman | 212/18 |

FOREIGN PATENT DOCUMENTS 1406242 4/1963 Fed. Rep. of Germany ........... 212/125

Primary Examiner—Samuel Scott
Assistant Examiner—Wesley S. Ratliff, Jr.
Attorney, Agent, or Firm—Oblon, Fisher, Spivak, McClelland & Maier

[57] ABSTRACT

A device for moving a robot or automatic machine having a first carriage movable along parallel rails in a direction X'OX and supporting a second carriage movable in a direction Y'OY perpendicular to the direction X'OX, along rails supported by said first carriage. The end elements of each of the carriages are modular in conception and constitute a lateral face of the carriage, comprising a flat housing open on one large face, said open face being closed by a plate secured thereto. The carriages are movable on racks on each of the supporting rails, being engaged by pinions, and a set of gears is disposed in each of the housings, being connected between a driving means and the shaft of the pinion in a first module of each carriage and being connected between a drive shaft between the first and second modules of each carriage and the shaft of the pinion of the second module, in the case of the second module.

8 Claims, 9 Drawing Figures

LINEAR-DISPLACEMENT MODULE FOR AUTOMATIC MACHINES

BACKGROUND OF THE INVENTION

1. Field of the Invention

The present invention relates to a linear-displacement module for automatic machines and more precisely to a linear-displacement module intended to constitute a lateral face of a carriage holding an automatic machine such as may be found on a gantry used for welding or assembling parts.

2. Description of the Prior Art

Carriages and gantries permitting displacement of a tool, a workpiece or a machine part in a plane X, Y are well known. In general, a first carriage permits displacements parallel to an axis X'OX. These displacements may amount to several meters. Since the carriage can be very wide, it is necessary to synchronize its two ends. This is generally done by mechanical means. The two ends are controlled, for instance, by two screws positively driven by the same motor. This first carriage, which moves along the axis X'OX, must be wide, between 1.5m and 3m, for it must in turn carry the guide rails parallel to the direction Y'OY, perpendicular to X'OX, so that a second carriage can move thereon along the axis Y'OY. The displacements of this second carriage may themselves be on the order of a meter or more. The carriage moving in the Y'OY direction may be much narrower than the first carriage, since it generally has to support only the means for moving a tool or part along an axis Z'OZ perpendicular to the XOY plane.

Different elements are used at present in realizing these carriages. The two displacement elements of the carriage moving in the X'OX direction are different from one another and are different, in turn, from the corresponding elements of the carriage for the Y'OY direction. This multiplicity of basic devices leads to high costs and the inability to respond rapidly to a particular order from a customer. Moreover, if it is desired to have these elements in stock, a great deal of space is required and the money tied up in these stocks is likewise very great.

SUMMARY OF THE INVENTION

According to the present invention, the linear-displacement module, which is intended to constitute a lateral face of a carriage holding an automatic machine, this module having at least one roller, and preferably two, permitting it to move along a rail, and at least one other roller with its axis perpendicular to the first two, for guiding the module along a direction perpendicular to that defined by the first-mentioned two rollers, is characterized by the fact that it consists of a flat housing open on one of its large faces and closed by a plate fastened to it by suitable means, by the fact that this flat housing encloses a set of gears connecting with a driving means external to the housing, a gear engaging with a rack integral with the rail and a drive shaft from the gear of a second module associated with the first module and at a distance from it to form a supporting carriage, and by the fact that there are two sets of machinings in the housing which are symmetric with respect to the plane containing the input shaft associated with the driving means and the axis of the gear engaging the rack, the machinings serving to receive the axes of the gears intermediate between the rack-engaging gear and the drive shaft between the first and second modules.

There is thus realized a unique linear-displacement module which can be utilized to produce carriages of any width. A carriage capable of motion along an axis is composed, then, of two such modules, each being situated at one of its ends, these two modules being joined by any suitable mechanical element. For two perpendicular axes, four perfectly identical modules are used. It is apparent, therefore, that to realize a displacement in a plane XOY, it is sufficient to stock a single type of linear-displacement module, regardless of whatever type of carriage or gantry one wishes to realize. This decided advantage is obtained without at all sacrificing the simplicity of each module.

Each module is controlled in its displacement either by a motor generally located on an outward face of the carriage or by a shaft coming from the other module and leading to an inward face of the carriage. In this way, a single motor can drive two modules in perfect synchronism. The drive-shaft motor turns a certain number of intermediate gears which, in their turn, drive, on one hand, a gear which engages a rack located on the fixed part of the gantry, parallel to the guide rails, and on the other hand, a drive shaft which, extending to the second module serving to form the carriage, rotates, in its turn, a gear engaging a second rack parallel to the first, thus synchronizing the two ends of the carriage.

The invention permits the realization of modules of very small dimensions which can be joined to one another by any type of structure, thus permitting the realization of carriages of arbitrary forms and dimensions. It also permits the superposition of modules for the realization of carriages moving along the axis X'OX and Y'OY without the risk of one interfering with the elements of the other, for example, the drive shaft joining two modules of the same carriage.

BRIEF DESCRIPTION OF THE DRAWINGS

Other characteristics will appear from the description which follows and which is given only by way of example. To this end, reference will be made to the attached drawings in which the same numeral references designate the same parts throughout the different views, and wherein.

DETAILED DESCRIPTION OF THE ILLUSTRATED EMBODIMENTS

Figure 1:
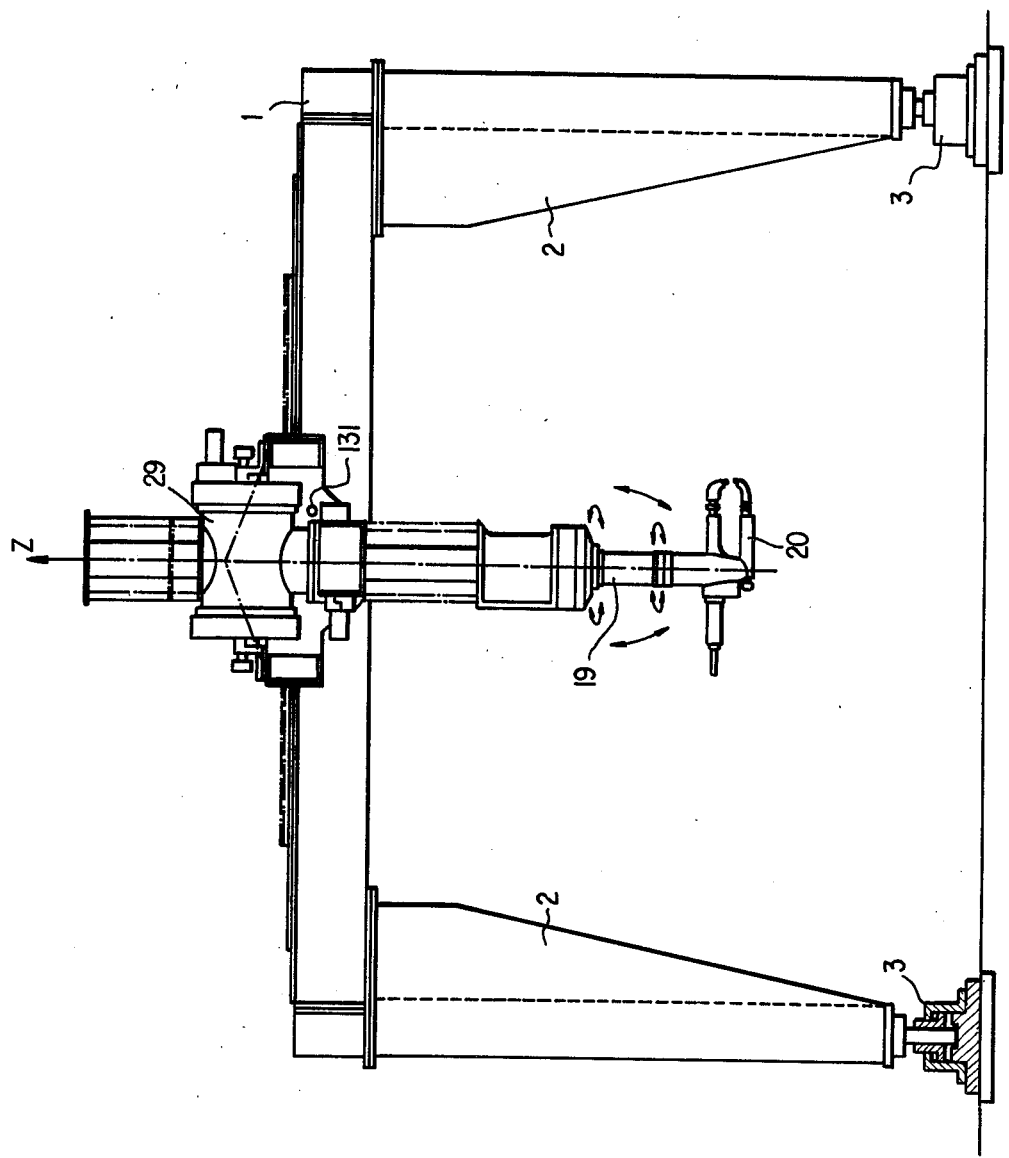
FIG. 1 is an elevational view of a gantry equipped with the modules of the present invention.
Figure 2:
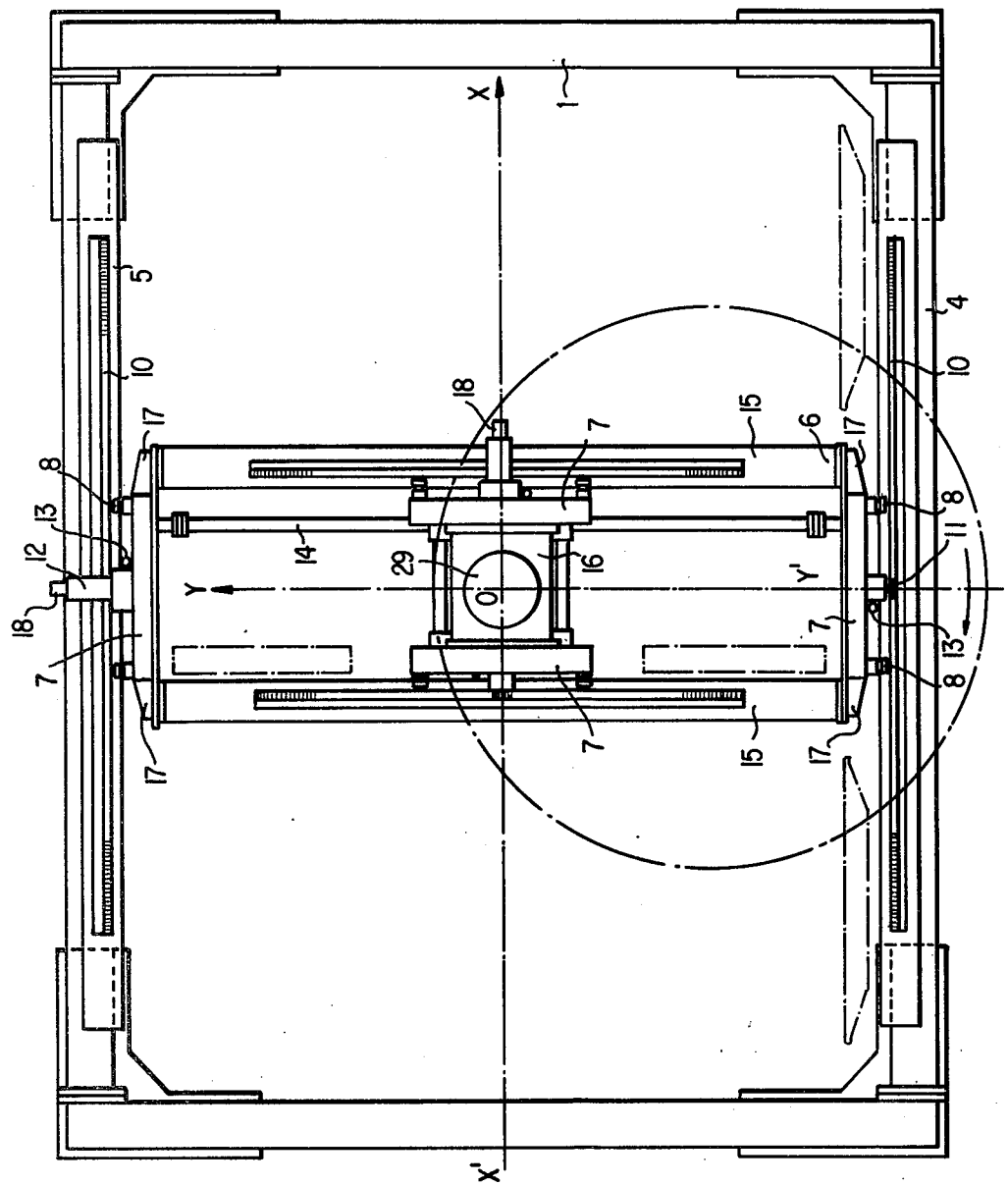
FIG. 2 is a schematic view of the gantry of FIG. 1, taken from above, and showing the carriages movable along the axes X'OX and Y'OY and the modules of the invention from which they are made.
Figure 3:
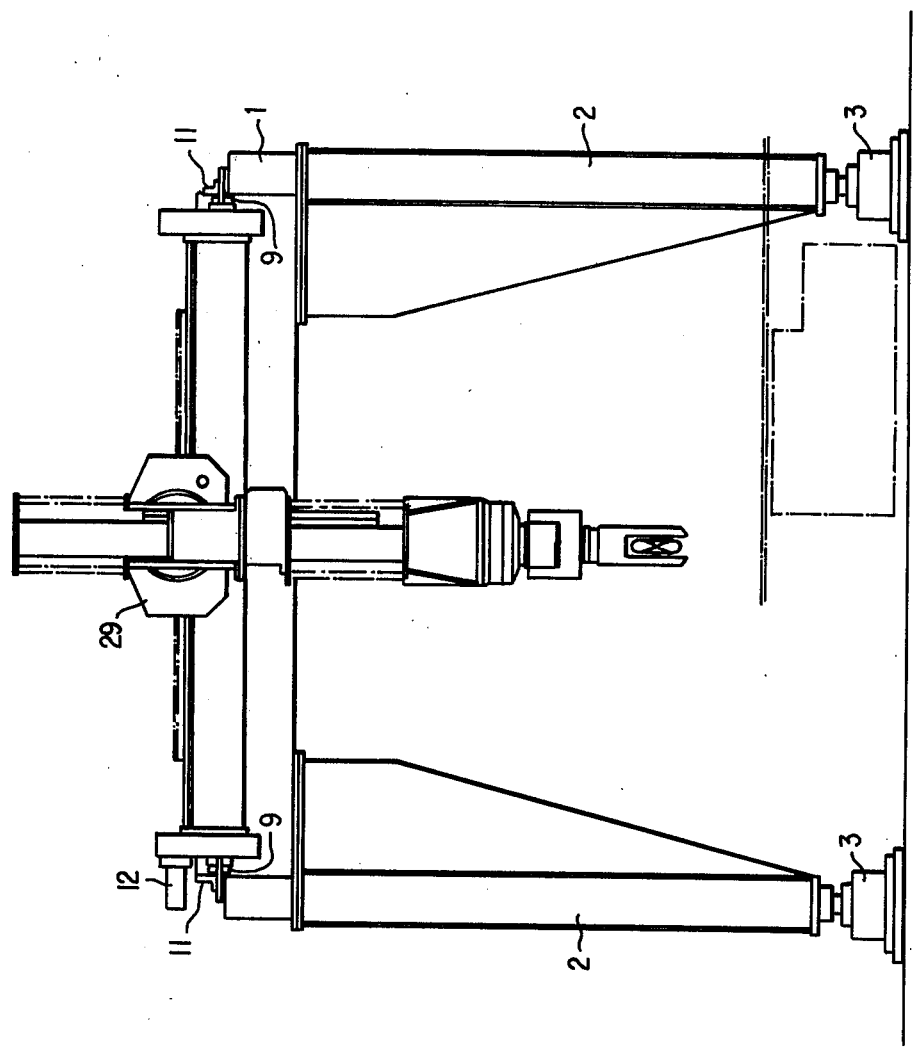
FIG. 3 is a vertical cross-section through the line YOY' in FIG. 2.

FIGS. 1, 2 and 3 show a gantry using the modules of the invention and serving, for instance, for spot welding of an element of the body of an automotive vehicle. To this end, the gantry comprises a fixed structure 1, in the form of a frame resting on the ground through the intermediary of legs 2. Its attitude with respect to the ground is adjusted with the aid of screw pads 3 positioned at the foot of the legs 2. FIG. 2 shows that the frame 1 supports guide rails 4 and 5 on which a carriage 6 moves parallel to the axis X'OX. The carriage 6 is made up of two linear-displacement modules 7 located at its ends, each of these modules 7 resting on a respective one of the rails 4 and 5 through the intermediary of vertical guide rollers 8, while other rollers 9 (FIG. 3) disposed therebetween prevent the carriage 6 from rising. FIGS. 2 and 3 show that the guide rails 4 and 5 carry racks 10, each of these racks 10 being engaged by a gear 11, only one of which is visible in FIG. 2, since the other one is hidden by a drive motor 12. Rollers 13 (FIG. 2) at opposite ends of the carriage 6 permit immobilizing the carriage 6 in the Y'OY direction. A drive shaft 14 extends from one of the modules 7 and is operative to turn the gear 11 in the other module 7.

The carriage 6 comprises a structure bearing parallel rails 15 disposed in perpendicular relation to rails 4 and 5, which support racks, the structure being identical to that carried by the frame 1 for allowing displacements along the axis X'OX. On the rails 15, there moves, along the axis Y'OY, a carriage 16, comprising at each of its ends a module 7, the morphology of which is rigorously identical to what has already been described. The only difference, as is apparent in FIG. 2, is that the carriage for the X'OX axis may have tips 17 for attachment of the support structures for the rails 15 which, in the carriage for the Y'OY axis, are cut off since they are useless for the modules utilized for displacement along the Y'OY axis. A coder 18, permitting measurement of the displacement of the respective carriages is located right at the end of each motor 12.

The carriage 16 carries a device 29 for displacement along the ZOZ' axis, which is not part of the invention, which carries at its end a head 19 with one, two or three degrees of freedom and holding a spot-welding clamp 20.

Figure 4:
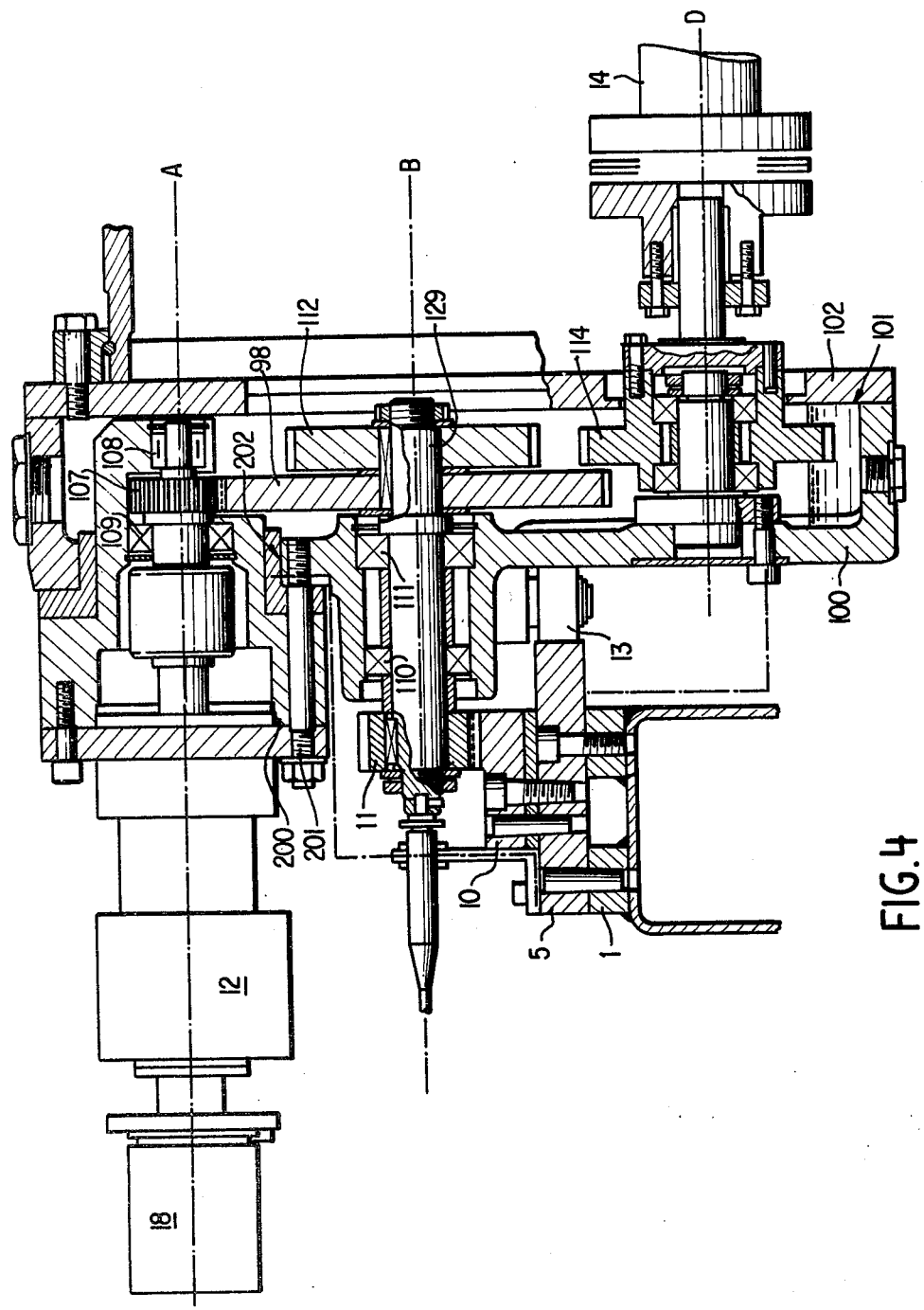
FIG. 4 is a cross-section through the line IV—IV in FIG. 6 of a module conforming to the invention and equipped with a drive motor.
Figure 6:
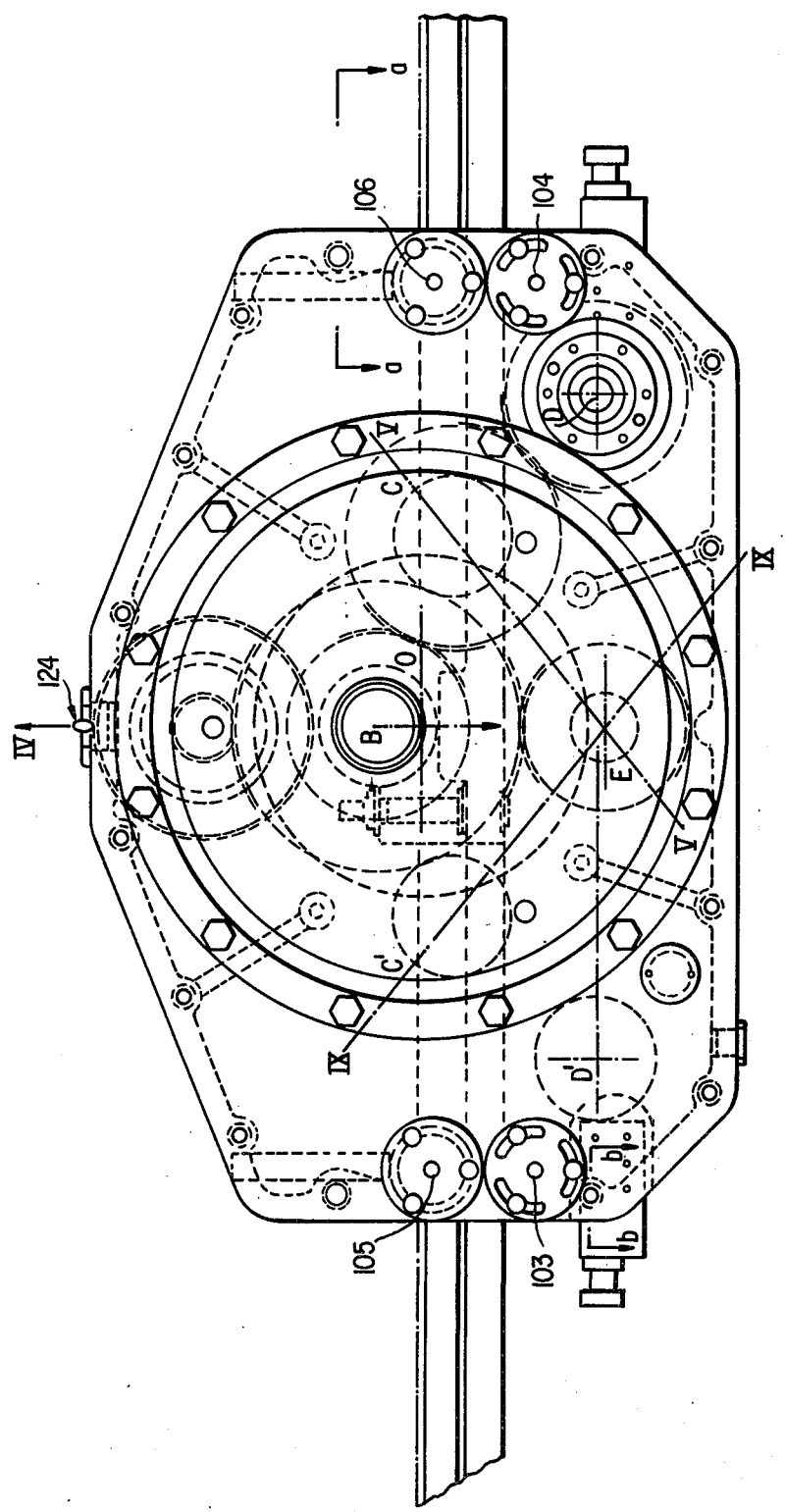
FIG. 6 is a view in elevation of a module conforming to the present invention.
Figure 7:
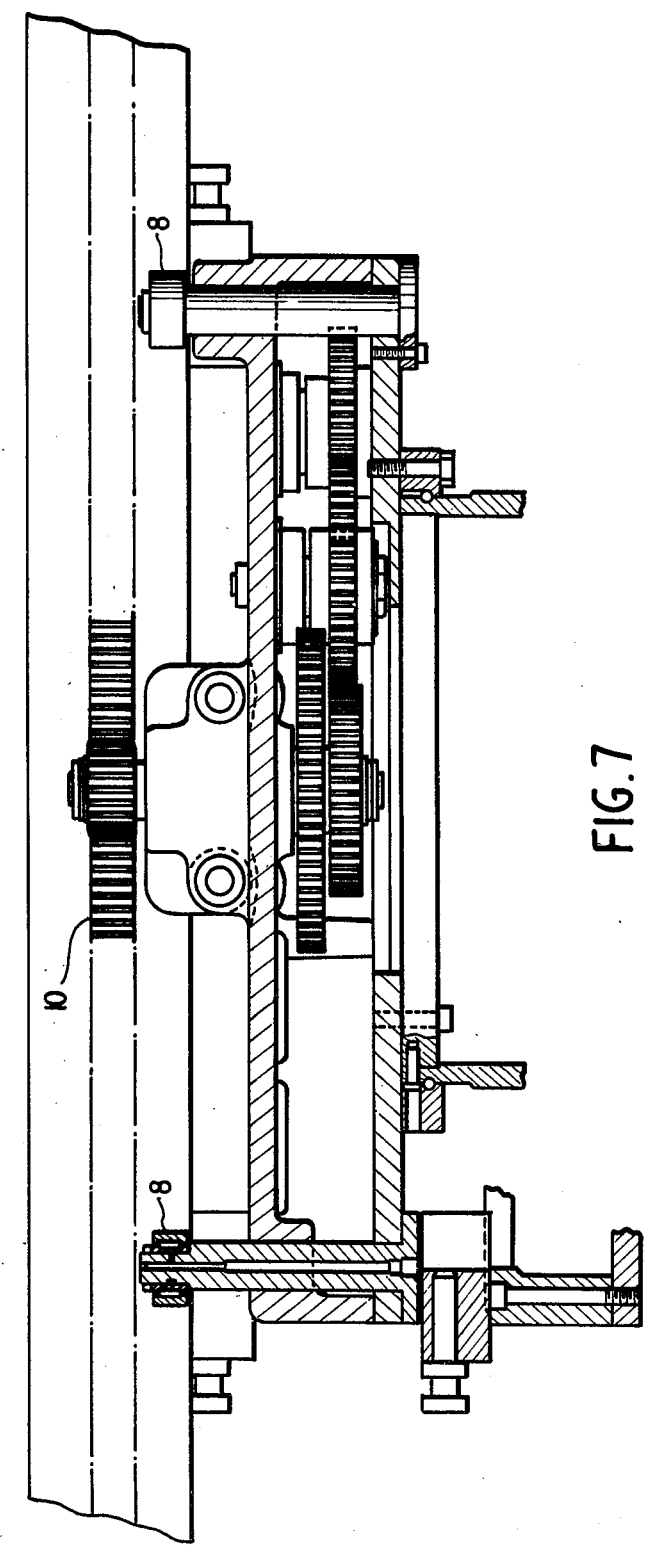
FIG. 7 is a partial section of FIG. 6, as far as the left part is concerned, by a section through b—b, and for the right side, through a—a.

FIG. 4 illustrates in detail a preferred embodiment of the module 7, according to the present invention. This module comprises a housing 100 made in the form of a box, one face 101 of which would be open. This face may be either the inner or outer face of the module. This open face 101 is closed tightly by a plate 102 which, when it is the inner face, attaches to the rail structure 15 of the carriage. This structure 15 is attached by means which are not part of the invention. In what follows, it will be supposed, in order to simplify the description, that the plate 102 is the inner face, but it is understood that if it were the outer face, it would be the one to carry the organs about to be mentioned. On the face 101 of the housing are mounted two rollers 8 (FIGS. 2 and 7), the axes 105 and 106 of which are indicated in FIG. 6. These rollers bear on the rails 4 and 5, as shown in FIG. 2. Also mounted on face 101 are two retaining rollers 9, the axes 103 and 104 of which are indicated in FIG. 6 and are eccentric with respect to those of the rollers 9. In this way by pivoting the axes of the rollers 9, the play between them and the guide rail 5 is varied. Likewise, the roller 13, visible in FIG. 4, prevents movement of the module in the direction perpendicular to the rail 5.

Figure 5:
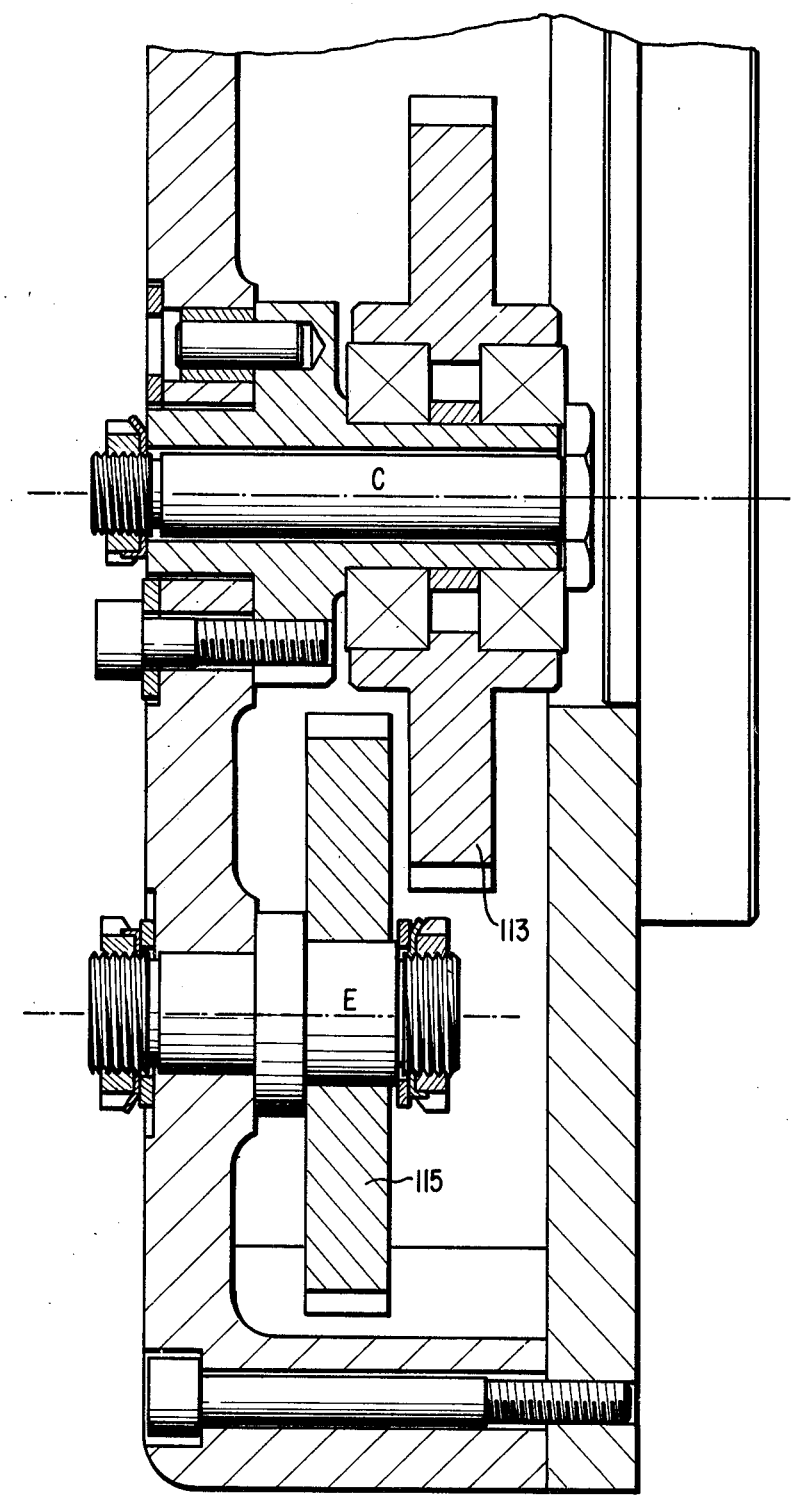
FIG. 5 is a cross-section through the line V—V in FIG. 6 of a part of a module of the invention.

In FIG. 4, the motor 12 drives a gear 107, having an axis A, and being mounted between two bearings 108 and 109. The gear 107 drives a gear 98, having an axis B, much larger in diameter than the axis A of gear 107, thus constituting a reducer. The gear 98 is integral with a shaft 129 passing outside the housing 100 and having keyed thereon the pinion 11, which engages the rack 10 held by the guide rail 5, which is rigidly attached to the frame 1 of the gantry of FIGS. 1 to 3. The motor 12, the gear 107 and the two bearings 108 and 109 are mounted in an auxiliary housing 200 which itself can pivot, when its mounting bolt 201 is loosened, in a boring 202, not concentric with the axis of the motor 12 and that of the pinion gear 107. This pivoting then permits taking up the play between the pinion 107 and the drive gear 98 for the pinion gear 11. When the motor 12 turns, it rotates a coder 18 at one of its ends and, at its other end, it drives the pinion 11 engaging the rack 10 for moving along one of the axes X'OX or Y'OY. A third gear 112 is keyed on the shaft 129 inside the housing 100. This gear 112 drives the shaft 14, having an axis D, for synchronization of the two modules by way of gears 113, with an axis C (FIG. 5), and 114, with an axis D (FIG. 4). The gear 113 is preferably mounted so as to shift parallel to itself in order to permit the elimination or reduction of play in the transmission of motion from pinion 112 to the shaft 14. In FIG. 5 is seen another pinion 115, with an axis E, which may be made of plastic, engaging the gear 98. Its role is to provide lubrication. It dips in an oil bath inside housing 100 and by slinging and contacting, it lubricates the gearing within the module.

Figure 8:
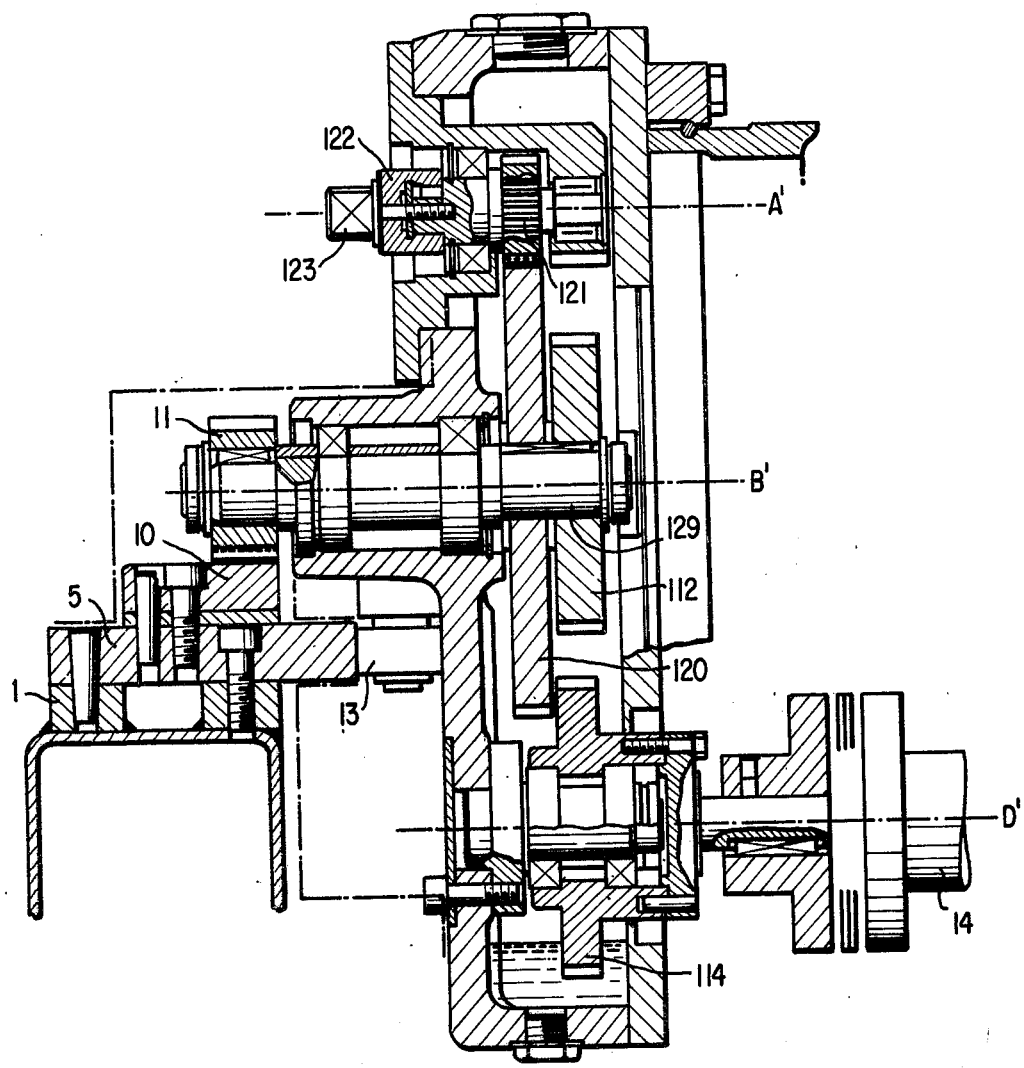
FIG. 8 is a sectional view taken along the line IV—IV in FIG. 6 of a module of the invention without a drive motor.
Figure 9:
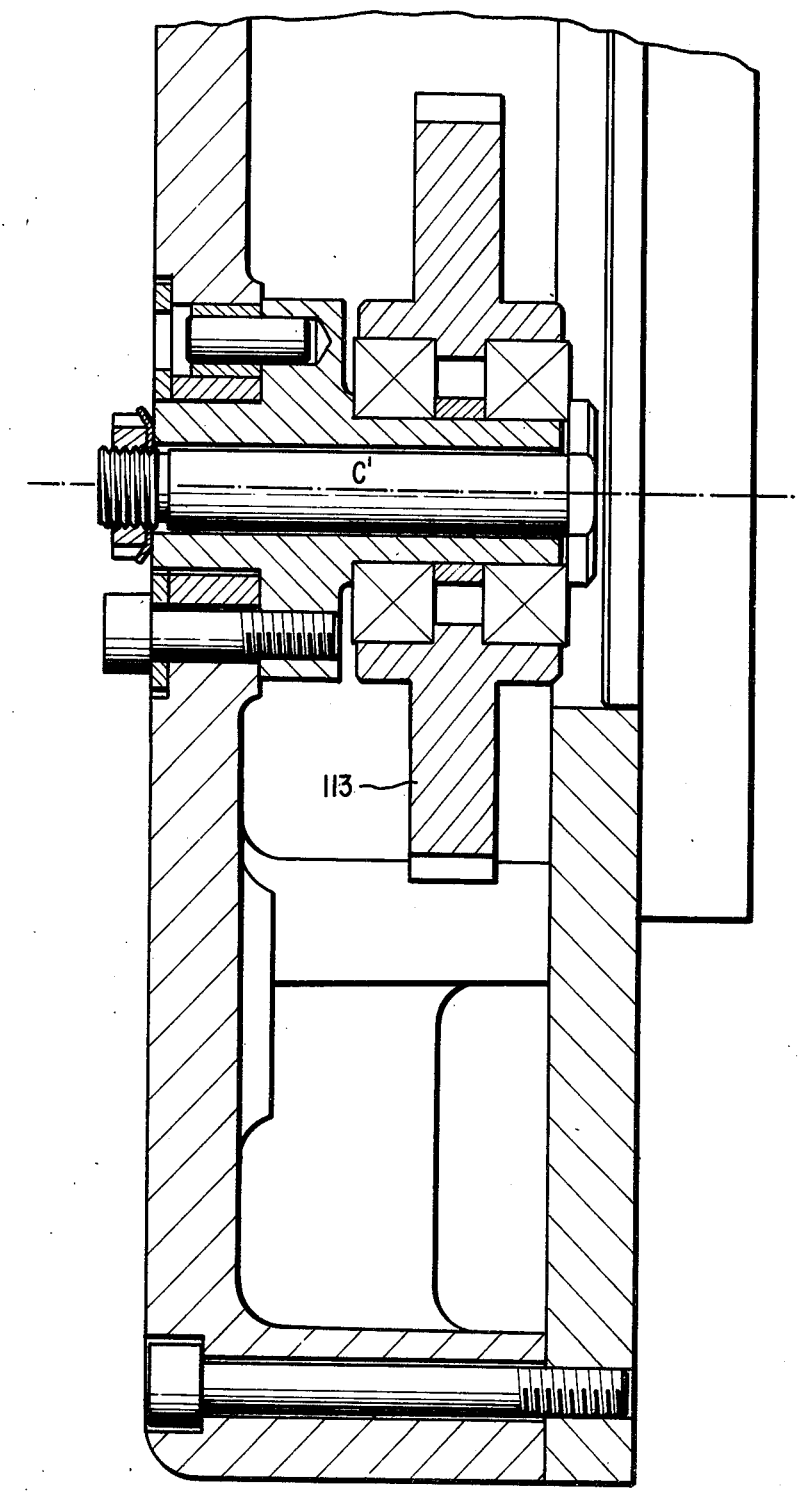
FIG. 9 is a cross-sectional view taken along the line IX—IX in FIG. 6 of a part of a module conforming to the present invention.

The motorless module, shown in FIGS. 8 and 9, is identical to the module with a motor of FIGS. 4 and 5. As previously indicated, the same references designate the same elements in FIGS. 4 and 5, on the one hand, and in FIGS. 8 and 9, on the other hand. The shaft 14 of FIGS. 4 and 8 drives, in FIG. 8, a gear 114, with an axis D', which engages a gear 113, with an axis C' (FIG. 9), which, in turn, engages a gear 112, with an axis B' (FIG. 8). The gear 112 is keyed on its shaft 109, which turns a second pinion 11, which engages a second rack 10, itself mounted on a second rail 5 supported on the same frame 1. Furthermore, a gear 120, identical or not to the gear 98 of FIG. 4, engages a gear 121, with an axis A', mounted similarly to the gear 107 of FIG. 4. Instead of being driven by a motor, the gear 121 receives a drive hub 122, the head 123 of which protrudes from the housing 100 and serves as manual input for moving the carriage along X'OX or Y'OY. This manual control passes through exactly the same boring in the module which served to center the motor on the module of FIG. 4. The preceding description shows that if the motor 12 of FIG. 4 turns, because of the similarity of pinions and their respective positions in the modules with a motor (FIGS. 4 and 5) and without a motor (FIGS. 8 and 9), the two modules move in perfect synchronism.

Now the necessary and sufficient conditions for the same module to be usable for realizing the two supporting ends of the same carriage will be considered. Referring to FIG. 6, which shows a module in elevation in its operating position on a rail 5, account being taken of the attachment of the carriage structure, in order to be able to use the right module on the left, it is necessary and sufficient that one be able to pass from the one to the other by a rotation of 180° about an axis 124 parallel to the axis OZ. In other words, it is necessary and sufficient that the right and left modules be images of one another in a plane mirror through 124 in FIG. 6. Shown in FIG. 6 are the positions of the axes A, B, E, C and D of the different gears encountered in FIGS. 4 and 5 and which permits passage from the drive motor 12 to the driven shaft 14, with an axis B. Also shown are the positions of the axes D', C', B and A of the different gears encountered in FIGS. 8 and 9 and which permit passage from the drive shaft 14, with an axis D', to the drive gear 121, with an axis A. Examination of this Figure shows that the only condition on using a module at either end of the carriage, with or without a motor, is that the basic module has four machinings or borings along the axes C, D, C' and D'. The same goes for the plate 102 which must have two borings D and D' symmetrically located with respect to the axis 124 in FIG. 6.

FIG. 1 shows at 131 the position of the connecting shaft 14, or DD' of the two modules of the carriage moving along the axis X'OX. This shaft must be located in a manner compatible with the carriage moving along axis Y'OY. However it is located, it must permit the movement of the latter carriage. The only condition that must be strictly observed is that this shaft 14, or DD' not be placed on the axis of rotation 124 of the modules constituting the carriage. In fact, it must be as far from it as possible and it is seen in FIG. 6 that this condition is effectively realized. The position in elevation of the shaft 14, or DD' must be such that it passes above or below the carriage moving along the axis Y'OY.

As the attached FIGURES show, the invention is particularly useful for the realization of carriages associated with gantries on which they are driven in linear displacement. These gantries themselves conveniently replace robots when a tool must move over a rather long distance, of the order of two meters or more, for instance. The invention can just as well be used in the realization of such carriages requiring a certain precision and a high velocity of displacement but in a fairly clean environment since the pinions, racks and guide rails are vulnerable.

Obviously many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A carriage assembly for a robot or automatic machine movable along a pair of parallel guide rails, being guided on each of said rails by at least one roller on one surface of the respective rail and at least one other roller on another surface of said respective rail, the axis of said at least one other roller being perpendicular to the axis of said at least one roller, comprising:
    at least a first carriage;
    a pair of modules, each constituting a lateral face of said first carriage and comprising a flat housing open on one large face, said open face being closed by a plate secured thereto;
    a rack on each of said rails;
    a pinion engaging each of said racks;
    external driving means for turning said pinions and being connected to one of said modules; and
    a set of gears in each of said housings, in the one module connecting said driving means and the shaft of said pinion thereof and, in the other module, connecting a drive shaft between said modules and the shaft of said pinion of said other module wherein each of said housings include two sets of borings, each of said borings being symmetric with respect to a plane containing the shaft of the pinion thereof engaging the respective rack and being perpendicular to the respective guide rail, said borings serving to receive the axes of the intermediate gears of said set of gears between said pinion and said drive shaft between said modules.

2. A carriage assembly for a robot or automatic machine movable along a pair of parallel guide rails, being guided on each of said rails by at least one roller on one surface of the respective rail and at least one other roller on another surface of said respective rail, the axis of said at least one other roller being perpendicular to the axis of said at least one roller, comprising:
    at least a first carriage;
    a pair of modules, each constituting a lateral face of said first carriage and comprising a flat housing open on one large face, said open face being closed by a plate secured thereto;
    a rack on each of said rails;
    a pinion engaging each of said racks;
    external driving means for turning said pinions and being connected to one of said modules; and
    a set of gears in each of said housings, in the one module connecting said driving means and the shaft of said pinion thereof and, in the other module, connecting a drive shaft between said modules and the shaft of said pinion of said other module wherein each of said housings include two sets of borings, each of said borings being symmetric with respect to a plane containing the shaft of the pinion thereof engaging the respective rack and being perpendicular to the respective guide rail, said borings serving to receive the axes of the intermediate gears of said set of gears between said pinion and wherein the closed body constituted by said housing and its cover plate has at least one eccentrically mounted roller situated on the other side of the guide rail from said at least one and said at least one other guide rollers.

3. A device as set forth in claim 1, wherein said driving means is a motor located outside the closed body constituted by said housing and its cover plate and having a coder at its end remote from said housing.

4. A device as set forth in claim 1, wherein said driving means is a manual drive disposed outside the closed body constituted by said housing and its cover plate.

5. A device as set forth in claim 1, wherein each of said sets of gears has one of the gears thereof movable parallel to itself in its plane so as to take up play in the gear train.

6. A device as set forth in claim 1, further comprising a second pair of parallel guide rails mounted on said first carriage and a second similar carriage linearly movable on said first carriage in a direction essentially perpendicular to the direction of movement of said first carriage.

7. A device as set forth in claim 6, wherein said driving means is an external drive motor and said other module is provided, in the corresponding location, with a manual driving means.

8. In a carriage movable along a pair of rails by means of a pinion gear through intermediate gears, a pair of modules constituting lateral faces of said carriage wherein each said module comprises a machining having means for receiving a pinion shaft and the axes of a set of intermediate gears, the machinings being characterized by a plane perpendicular to the guide rail which contains said means for receiving a pinion shaft; wherein the pair of machinings are constructed so as to be symmetric about said plane so that any machining may be reversed to become interchangeable with any other machining.

* * * * *